Nov. 16, 1954  W. M. DILLON  2,694,415
DIAPHRAGM CONSTRUCTION FOR THERMOSTATS OR MOTORS
Filed Dec. 23, 1950
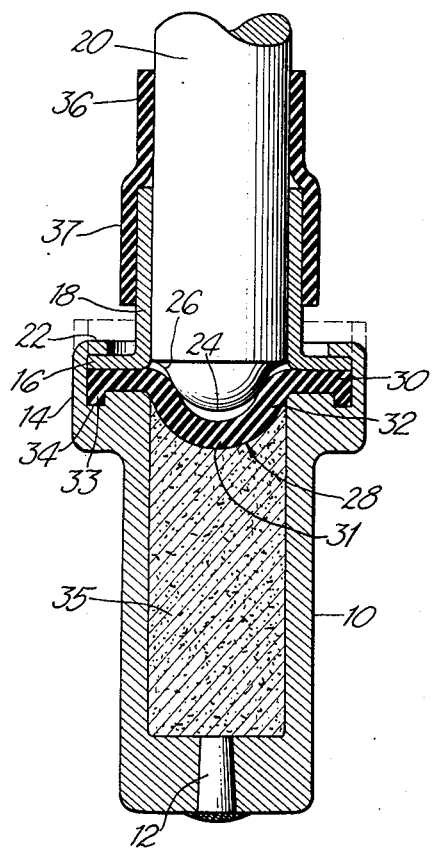
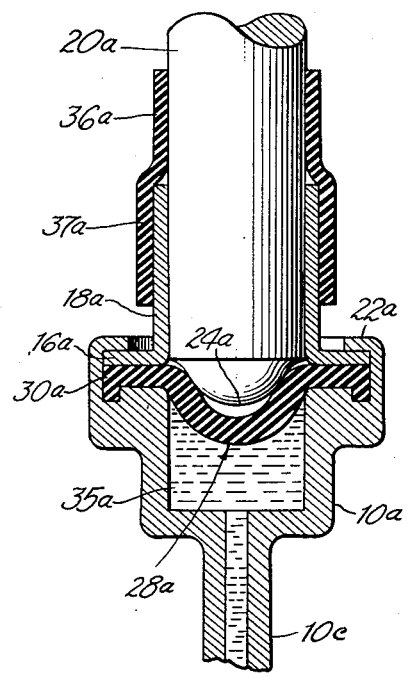
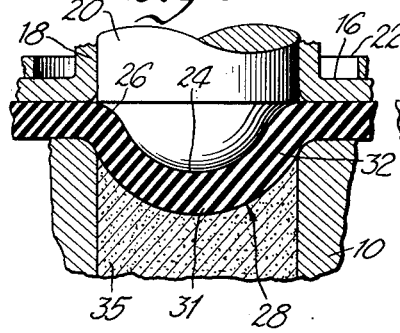
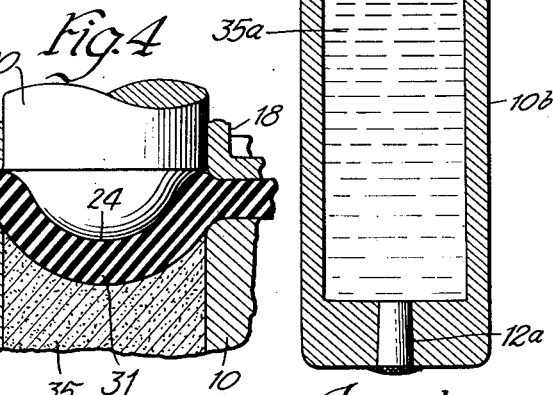
Inventor
Wendell M. Dillon
by Bair, Freeman & Molinare
Attorneys

United States Patent Office 2,694,415
Patented Nov. 16, 1954

2,694,415

DIAPHRAGM CONSTRUCTION FOR THERMOSTATS OR MOTORS

Wendell M. Dillon, Lawrence, Mass., assignor to Watts Regulator Company, Lawrence, Mass., a corporation of Massachusetts Application December 23, 1950, Serial No. 202,510

1 Claim. (Cl. 137—792)

The present invention relates to a thermostat or motor for use in connection with the operation of valves, controls, and other appliances.

The device of the present invention is included in that general class of thermostats or motors having a housing, a work plunger or piston slidable in the housing, an expansible material for actuating the piston, and a flexible diaphragm interposed between the piston and the expansible material. The diaphragm is for the purpose of preventing the expansible material from seeping out of the housing around the piston and provides a flexible seal which will contain the expansible material substantially within the housing but upon expansion of the material will permit linear movement of the piston.

In most previous devices of the general character above referred to and in which a flexible diaphragm was employed, the diaphragm was substantially flat and the plunger had a flat or rounded end. I find with such previous devices that there are certain undesirable features in performance, principally the deformation of the diaphragm which does not give a positive setting of the valve or other device controlled by the work plunger or piston. A change in loading on the plunger in these previous devices produces a greater deformation of the diaphragm which means that there must be expansion of the expansible material acting on the diaphragm through a greater number of degrees before the work plunger reaches the same position so that the valve would not always operate at the same temperature and this variable would be due to conditions in the thermostat or motor construction resulting in variations in pressure which would affect the net loading on the work plunger. An object therefore of the present invention is to eliminate these defects by means of a contoured diaphragm and a face on the work plunger which is contoured to be compatible with the contoured diaphragm.

Another object is the provision of a thermostat or motor of the general nature referred to, in which the contouring of the diaphragm consists of providing a central depressed or looped portion surrounded by an annular reverse curved portion terminating in a substantially flat sealing flange to be confined between a housing for expansible material and a guide sleeve for the work plunger.

Still another object of the invention is the provision of a thermostat or motor of the above nature in which the end of the work plunger next to the diaphragm is contoured in a somewhat similar manner, that is provided with a central convexly rounded portion and an annular concave portion surrounding the central portion and terminating in a substantially flat plane at the periphery of the plunger.

A further object is the provision of a thermostat or motor of the above character in which the work plunger is effectively sealed by means of a boot surrounding the work plunger and having an enlarged portion surrounding the adjacent portion of the plunger housing to prevent damage to the work plunger and exclude dirt or other foreign matter from entering between the plunger and the housing.

With these and other objects in view,

Figure 1 is a longitudinal sectional view of a thermostat embodying the present invention and showing the piston prior to being loaded as with a spring loaded valve or the like;

Figure 2 is a view similar to Figure 1 but showing a modification in which a cell of expansible material is set apart from the valve, Figure 1, showing the cell next to the diaphragm;

Figure 3 is an enlarged portion of Figure 1 showing the relationship of the parts when a load is applied to the work plunger as for instance the spring loading of a valve or other device controlled by the plunger; and Figure 4 is a similar view showing the parts in operative position, that is, when expansion has taken place and moved the plunger to perform a valve opening or closing operation or the like.

Referring in detail to the drawings, the device includes a housing 10 which in the preferred form is cylindrical and has an open upper end. It will be understood that the device can be used in any position but for purposes of convenience in the present description the open end will be referred to as the upper end. The opposite or lower end of the housing 10 is of closed construction. The plug 12 is used to seal the housing after it is filled with a suitable expansible material 35.

The numeral 20 refers generally to a piston or work plunger slidable in a sleeve or guide element 18 forming an extension of the upper end of the housing 10. The sleeve 18 has an outwardly extending mounting flange 16 and the housing 10 has an annular flange 14 to surround it. The upper end of the flange 14 is inturned as at 22 to hold the parts assembled, a diaphragm 28 being interposed between the two. The piston 20 is adapted to be connected with a switch, valve or other control, as will be readily understood.

The lower end of the piston presents a contoured surface having a rounded or convex central part indicated at 24 and a peripheral part 26 forming a concave ring around the central part. The piston substantially spans the internal diameter of the sleeve 18, being preferably a working or sliding fit therein.

The numeral 28 indicates generally a diaphragm which preferably is composed of rubber or a rubber product such as butyl rubber as it is substantially non-permeable. The diaphragm 28 includes an outer flange portion 30 which is provided with a bead 33 to seat in an annular groove 34 of the housing 10 to thereby firmly anchor the diaphragm with respect to the housing and the sleeve 18 when the upper marginal edge of the flange 14 is turned from the dotted original shape inwardly as at 22.

Since the diaphragm 28 is preferably of rubber or rubber product, it is of course stretchable and yieldable and it is likewise deformable. It is understood that other materials have the same general physical characteristics as above specifically referred to.

The expansible material 35 is inserted in the housing 10 filling the latter up to the diaphragm 28 after which the lower end of the housing is closed by the closure plug 12 which is secured in place by any preferred method such as by welding. In the completed unit, air is removed by suitable means so that within the operating range the housing is completely filled with the expansible material. The expansible material may be of any numerous preferred forms such as wax, crystalline material, etc. Whatever the material 35 used is, it is subject to expansion application of heat thereto and is subject to contraction upon cooling.

The diaphragm 28 is preformed before assembly between the sleeve 18 and the housing 10 and particularly the partition element 31—32 thereof is preformed. The partition element in its normal condition, as illustrated in Figures 1 and 2, has the looped portion 31 at its center depending below the uppermost extremities thereof, and has the annular reversely curved part 32. The partition element thus has a surface area greater than the cross-sectional area of the housing, whereby the partition element can be flexed and deformed and moved from one position to another without stretching. The exact shape of the partition element as illustrated in Figure 1 is of course only a drafting representation and it is impossible to accurately illustrate any one of its numerous intermediate positions.

In order to exclude dirt and other foreign material from between the guide sleeve 18 and the work plunger 20, I provide a boot 36 of rubber-like material having an enlarger portion 37. The portion 36 is snugly fitted around the plunger 20 and the portion 37 is snugly fitted around the sleeve 18. Accordingly, the plunger can move the required amount for valve actuation with respect to the sleeve and the portions 36 and 37 will be stretched or distorted to some extent but the seal at this point will remain intact.

The diaphragm 28 and the lower end of the plunger 20 are contoured as described and as shown in Figures 1 and 2 so that the parts are in the position illustrated when there is no load on the plunger. Accordingly, when a load is applied such as the spring load of a valve, the plunger is forced downwardly until it contacts the diaphragm substantially its entire diameter inside its contact with the flange 16 of the sleeve 18 as in Figure 3. It is obvious that when the parts are thus in the loaded position, there is substantially no space left for any deformation of the diaphragm when the expansible material 35 expands due to temperature rise and moves the parts for instance to the position shown in Figure 4. Since the rubber 31 is incompressible and air spaces have been minimized due to the contouring of the diaphragm and the plunger, the desirable result of a predetermined increment of movement of the plunger 20 for each increment of expansion of the material 35 is had. In other words, the response of the valve or the device controlled by the work plunger is accurately proportional to the expansion of the material 35. Obviously this is a very desirable result in the operation of automatic valves and similar control devices.

In the installation of my thermostat or motor, the work plunger 20 is connected to the valve or other appliance being operated in such a way that the load of the appliance is exerted on the plunger which forces it downwardly to the position of Figure 3. Upon expansion of the expansible material 35, the plunger then moves in the desired proportional relationship to the expansion of the material.

The diaphragm 28 remains in the loaded position of Figure 3 the same as in the unloaded position of Figure 1. The plunger, however, moves downwardly under the force of the load to minimize the air space between the diaphragm and the plunger so that upon operation of the appliance resulting from expansion of the material 35, an accurate movement-to-expansion relationship is had. The looped character of the diaphragm 28 contoured as disclosed and the contouring of the plunger compatible therewith are important contributions to this result.

My thermostat or motor is readily adaptable as in Figure 1 for controlling a valve or the like in response to temperature adjacent the valve or from a remote point as disclosed in Figure 2. In said Figure 2 the housing is indicated as 10a and there is a bulb or cell 10b remote therefrom, the two being connected by a conduit 10c and the expansible material 35a then filling all three of the elements just enumerated. In an installation of this kind, material such as those in the alcohol groups are suitable depending upon the particular installation and the temperatures encountered.

In the interpretation of the claims herein, it is intended that the expression "expansible material" encompasses not only the material indicated at 35 which is actually expansible but the liquid 35a which may not be operative in response to expansion as such but rather in response to flowing into the article and being thereby effectively expansible. For instance, in place of the bulb 10b a piston-cylinder arrangement might be provided for mechanically displacing fluid through the conduit 10c into the housing 10a and being thereby effectively expansible in the housing 10a.

The partition element 28 can be moved in response to expansion of the expansible material 35 from the position shown in Figure 3 to the position shown in Figure 4 without stretching the partition element, that is, the partition element possesses sufficient surface area that can be folded, looped, or deformed. In the deformation of the partition element it is not stretched but is "unfolded" in a manner similar to a bellows. The effect is that when the piston is in retracted position the partition element 28 assumes the position in which it occupies an area less than its full extended area and when it is expanded or extended, it assumes an actual area that is greater than its effective area in collapsed or retracted position. Thus, there is no stress on the partition element 28. The diaphragm 28 thus not only serves the previously known purpose of preventing the expansible material from seeping out around the piston but also the diaphragm is such that a true movement-to-pressure or temperature ratio is had.

The device illustrated in Figure 1 is what is known as a thermostat, that is, it operates in response to changes in temperature. However, it is contemplated that the device may be employed as a motor such as illustrated in Figure 2. The construction of the device is the same as in Figure 1 except that instead of a single closed housing, a housing is employed having a tubular portion 10c for connection with a source of fluid such as a cell 10b. Instead of employing an expansible material, the fluid 35a is flowed bodily into the interior of the housing 10a and therefore the device would not operate as a thermostat but as a motor. In the interpretation of the claim herein it is intended that the expression "expansible material" encompasses not only the material 35 which is actually expansible but the liquid 35a which may not be operative in response to expansion as such, but rather in response to flowing into the housing 10a and being thereby effectively expansible.

While I have herein shown and described certain embodiments of my invention, it will be understood of course that I do not wish to be limited thereto since many modifications may be made, and I therefore contemplate by the appended claim to cover any such modification or substitution of mechanical equivalents as fall within the true spirit and scope of my invention.

I claim:

In a construction of the character disclosed; a two part housing, each part having a cylindrical bore of constant diameter registering with the bore of the other part; a work plunger having a diameter substantially the same as the bore and slidably received in the bore and having its end in the form of a shallow convex dome; a flexible diaphragm of substantial thickness extending across the bore having a central looped portion seated against the entire face of the dome and sandwiched between the parts at its entire area outboard the central looped portion; and expansible material disposed in the housing on the side of the diaphragm opposite the work plunger whereby the diaphragm is sandwiched at its central looped portion between the plunger and the expansible material and at all other portions by the parts of the housing and whereby the plunger has limited movement between a lower position wherein the edge of the dome is flush with the lower edge of the upper section and an upper position wherein the plunger is above the lower edge of the upper section by a distance less than the thickness of the diaphragm.

References Cited in the file of this patent

UNITED STATES PATENTS

| Number | Name | Date |
|---|---|---|
| 2,034,538 | Schnell | Mar. 17, 1936 |
| 2,178,953 | Chilton | Nov. 7, 1939 |
| 2,264,413 | Siegerist | Dec. 2, 1941 |
| 2,489,769 | Flick | Nov. 29, 1949 |

FOREIGN PATENTS

| Number | Country | Date |
|---|---|---|
| 10,607 | Great Britain | Mar. 17, 1936 |
| 531,280 | Great Britain | Jan. 1, 1941 |